US010728339B2

(12) United States Patent
Tyagi et al.

(10) Patent No.: US 10,728,339 B2
(45) Date of Patent: Jul. 28, 2020

(54) METHOD AND SYSTEM OF LOCALIZED SENSOR NETWORK MANAGEMENT WITH INODE INSTANCES

(71) Applicants: Dhawal Tyagi, Saratoga, CA (US); Dhruva Narasimhan, Chennai (IN)

(72) Inventors: Dhawal Tyagi, Saratoga, CA (US); Dhruva Narasimhan, Chennai (IN)

( * ) Notice: Subject to any disclaimer, the term of this patent is extended or adjusted under 35 U.S.C. 154(b) by 0 days.

(21) Appl. No.: 15/644,394

(22) Filed: Jul. 7, 2017

(65) Prior Publication Data
US 2019/0075164 A1 Mar. 7, 2019

Related U.S. Application Data

(60) Provisional application No. 62/360,451, filed on Jul. 10, 2016.

(51) Int. Cl.
*H04L 29/08* (2006.01)
*H04L 29/06* (2006.01)
*H04W 4/70* (2018.01)

(52) U.S. Cl.
CPC .......... *H04L 67/12* (2013.01); *H04L 63/0281* (2013.01); *H04L 67/10* (2013.01); *H04L 67/28* (2013.01); *H04L 67/289* (2013.01); *H04W 4/70* (2018.02)

(58) Field of Classification Search
CPC ..... H04L 67/12; H04L 67/10; H04L 63/0281; H04L 67/28; H04L 67/289; H04L 29/089; H04L 29/08558; H04L 67/2809; H04L 67/2823; H04W 4/70
See application file for complete search history.

(56) References Cited

U.S. PATENT DOCUMENTS

| 9,401,815 B2 * | 7/2016 | Larter ................. H04L 12/2838 |
| 2014/0164480 A1 * | 6/2014 | Anderson ............... H04L 67/10 709/203 |
| 2016/0026729 A1 * | 1/2016 | Gil ...................... H04L 63/1416 726/23 |
| 2017/0064412 A1 * | 3/2017 | Taxier ................ H04N 21/8133 |
| 2017/0188266 A1 * | 6/2017 | Tian ..................... H04W 28/08 |
| 2017/0235585 A1 * | 8/2017 | Gupta ................ G06F 9/45558 718/1 |
| 2017/0237623 A1 * | 8/2017 | Hopkins ................. H04W 4/70 709/223 |
| 2017/0279671 A1 * | 9/2017 | Christopher ........ H04L 67/2823 |

* cited by examiner

*Primary Examiner* — Patrice L Winder
*Assistant Examiner* — Aye M Aung

(57) ABSTRACT

In one aspect, a computerized method for managing an iNode system includes the step of obtaining, with a local iNode, a legacy sensor data of a legacy sensor. The local iNode includes an instance of a sensor management operating system that is installed in a local gateway and communicatively coupled with the legacy sensor. The computerized method includes the step of aggregating the legacy sensor data with at least one application in the local iNode. The computerized method includes the step of communicating the aggregated legacy sensor data to a set of remote iNodes. The computerized method includes the step of implementing, with an Orchestrator, a specified legacy sensor data analytics operation with the set of remote iNodes.

17 Claims, 11 Drawing Sheets

METHOD AND SYSTEM OF LOCALIZED SENSOR NETWORK MANAGEMENT WITH INODE INSTANCES

CROSS-REFERENCE TO RELATED APPLICATIONS

This application claims priority to U.S. Provisional Application No. 62/360,451, titled and METHOD AND SYSTEM OF LOCALIZED SENSOR NETWORK MANAGEMENT filed on 10 Jul. 2016. This provisional application is incorporated by reference in its entirety.

BACKGROUND

1. Field

This application relates computerized networks and more specifically to a system, article of manufacture and method for localized sensor network management with iNode instances.

2. Related Art

Industrial Internet of Things (IoT) networks can include many legacy systems. These legacy systems may not have been meant to be connected to Internet. Given the data that these systems generate, there is a significant business value that can be generated from this data. Accordingly, there is a clear need to extract this data out of these systems, without exposing these systems to the inherent security risks that exist on Internet connected systems.

BRIEF SUMMARY OF THE INVENTION

In one aspect, a computerized method for managing an iNode system includes the step of obtaining, with a local iNode, a legacy sensor data of a legacy sensor. The local iNode includes an instance of a sensor management operating system that is installed in a local gateway and communicatively coupled with the legacy sensor. The computerized method includes the step of aggregating the legacy sensor data with at least one application in the local iNode. The computerized method includes the step of communicating the aggregated legacy sensor data to a set of remote iNodes. The computerized method includes the step of implementing, with an Orchestrator, a specified legacy sensor data analytics operation with the set of remote iNodes.

Figure 1:
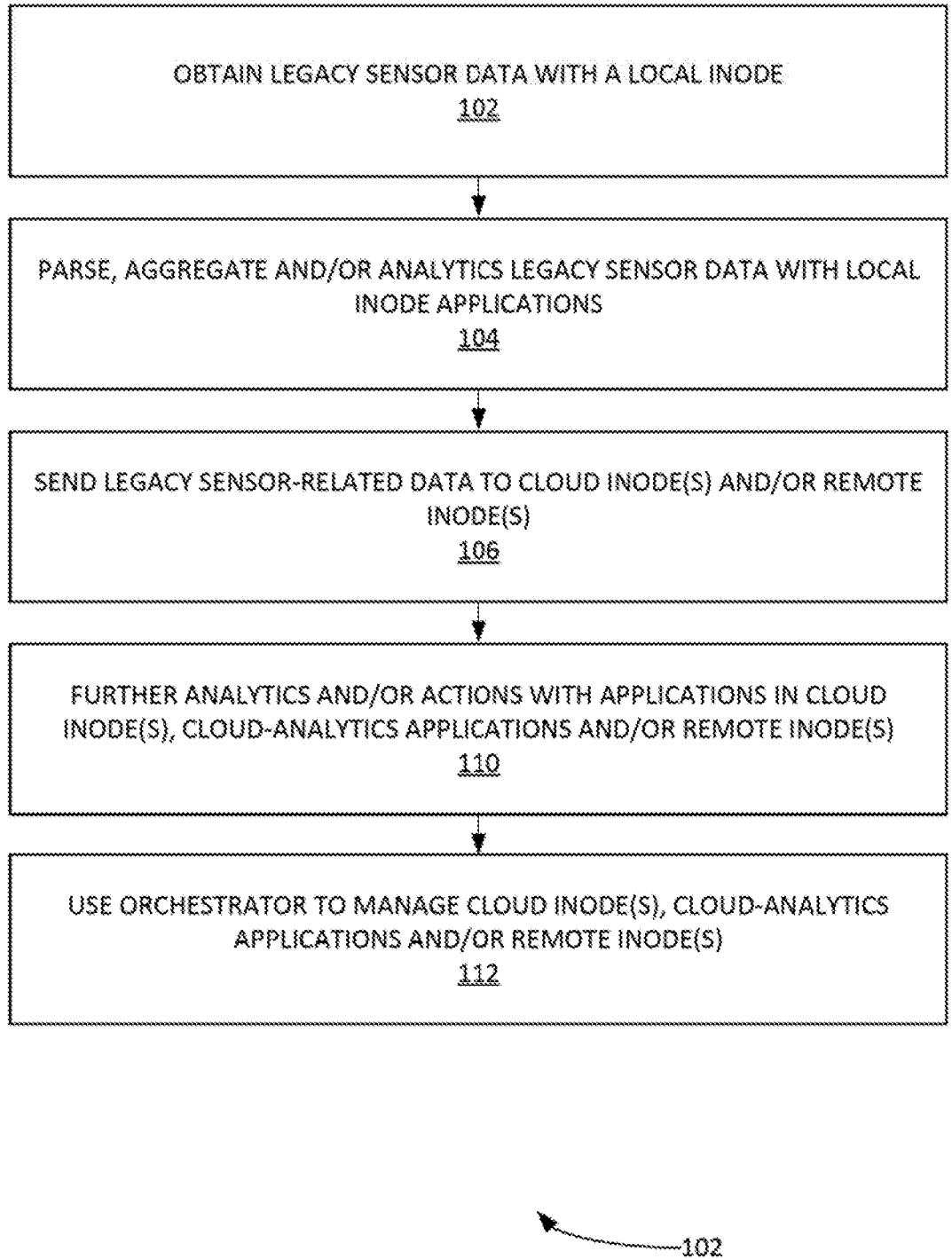
FIG. 1 illustrates an example process for managing an iNode system, according to some embodiments.

The Figures described above are a representative set, and are not an exhaustive with respect to embodying the invention.

DESCRIPTION

Disclosed are a system, method, and article of method and system of localized sensor network management with iNode instances. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Amazon Machine Image (AMI) can be a virtual appliance for use with the Amazon Elastic Compute Cloud (EC2).

Application Programing Interface (API) can be a defined inter-program interface.

BACnet is a communications protocol for Building Automation and Control (BAC) network that leverages the ASHRAE, ANSI, and ISO 16484-5 standard protocol.

Service Chain Optimization can be the application of processes and tools that embrace functions for improving the efficiency, productivity and, eventually, the profitability of service organizations.

Certificate authority (CA) can be an entity that issues digital certificates. A digital certificate certifies the ownership of a public key by the named subject of the certificate. This can enable others (e.g. relying parties) to rely upon signatures or on assertions made about the private key that corresponds to the certified public key. A PKI schemes can utilize CAs.

Certificate signing request (CSR) can be a message sent from an applicant to a certificate authority in order to apply for a digital identity certificate.

Cloud-computing service can be a suite of cloud computing services that make up an on-demand computing platform (e.g. Amazon Web Service® (AWS), Microsoft's Azure®, etc.).

Computer network or data network is a telecommunications network that allows computers to exchange data.

Edge analytics can be an approach to data collection and analysis in which an automated analytical computation is performed on data at a sensor, network switch and/or other device (e.g. an iNode, etc.), instead of waiting for the data to be sent back to a centralized data store.

Firewall can be a technological barrier designed to prevent unauthorized or unwanted communications between computer networks or hosts.

Hypervisor can be a piece of computer software, firmware or hardware that creates and runs virtual machines.

Gateway can be a network node equipped for interfacing with another network that uses different communication protocols. A gateway can be an ODM system.

iNode can be an instance of a sensor management operating system. Locally, an iNode can be installed in a local gateway and communicatively coupled with one or more local legacy sensors. An iNode can also be implemented in a cloud-computing platform. A local iNode communicates with other local iNodes, remote iNodes (e.g. iNodes installed in other gateways at a remote location with legacy sensor(s)) and/or cloud-based iNodes. In one example, an iNode can be connected with one or more local legacy sensors via an Ethernet or other local area network.

Internet of things (IoT) is the network of physical objects-devices, vehicles, buildings and other items—embedded with electronics, software, sensors, and/or network connectivity that enables these objects to collect and exchange data.

Legacy can refer to a previous and/or outdated system that is still in use. In some examples a legacy system can refer to systems still in use that were implemented and/or designed two or three decades before present systems.

Legacy sensors can be sensors used in existing industries and technologies but have not been invented in specified period of times (e.g. ten (10) years, twenty (20) years, thirty (30) years, etc.). A legacy sensor can be localized to a certain part or system. For example, a legacy sensor can be a drill-bit sensor that senses if a drill-bit is too worn (e.g. by counting the number of times a drill is used). In another example, legacy sensors can be an optical system. Legacy sensors can be coupled with a localized management and/or mechanical system (e.g. with an LCD panel, a mechanical counter, etc.). In some examples, a Legacy Sensor can be defined as either an Internet protocol (IP) or a non-IP based sensor which generates measurement data for another device.

Middle mile can be the segment of a telecommunications/computer network linking a network operator's core network to the local network.

Multiple Spanning Tree Protocol (MSTP) and algorithm can provides connectivity assigned to any given Virtual LAN (VLAN) throughout a Bridged Local Area Network.

Orchestrator can provide various cloud-computing services. An orchestrator can include various modules and orchestrate an iNode network. The orchestrator can implement policy and be a management platform for the iNode instances.

A user can log into an orchestrator and manage various iNodes.

Original design manufacturer (ODM) can be a company that designs and manufactures a product as specified and eventually rebranded by another firm for sale.

Public key infrastructure (PKI) can be a set of roles, policies, and procedures needed to create, manage, distribute, use, store, and revoke digital certificates and manage public-key encryption.

Sensor can be an object whose purpose is to detect events or changes in its environment, and then provide a corresponding output. A sensor can be a type of transducer; sensors may provide various types of output, but can also use electrical or optical signals.

Things in the 'Things Area Network' (TAN) trust metric can be a network of sensors and/or any other devices.

Trust Metric can be a quantified representation of the measure of trust in this network by either internal or external entities.

Trusted Platform Module (TPM) is an international standard for a secure cryptoprocessor, which can be a dedicated microcontroller designed to secure hardware by integrating cryptographic keys into devices.

Virtual machine can be an emulation of a particular computer system. Virtual machines operate based on the computer architecture and functions of a real or hypothetical computer, and their implementations may involve specialized hardware, software, or a combination of both.

EXEMPLARY METHODS

FIG. 1 illustrates an example process 100 for managing an iNode system, according to some embodiments. In step 102, process 100 can obtain legacy sensor data with a local iNode. In step 104, process 100 can parse, aggregate and/or analyze legacy sensor data with local iNode applications. In step 106, process 100 can send legacy sensor-related data to cloud iNode(s) and/or remote iNode(s). In step 108, process 100 can further analytics and/or actions with applications in cloud iNode(s), cloud-analytics applications and/or remote iNode(s). In step 110, process 100 can use an orchestrator to manage cloud iNode(s), cloud-analytics applications and/or remote iNode(s).

Figure 2:
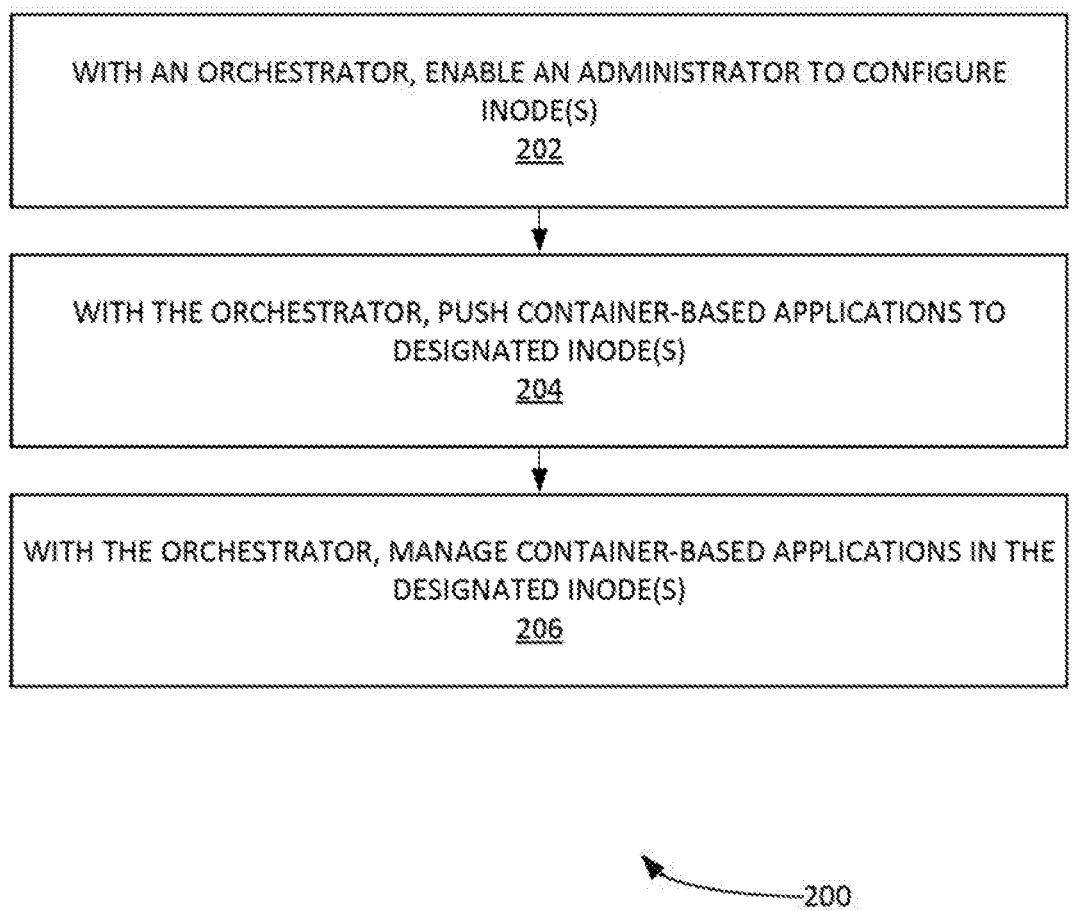
FIG. 2 illustrates an example process for configuring a system of iNodes with a cloud-based orchestrator, according to some embodiments.

FIG. 2 illustrates an example process 200 for configuring a system of iNodes with a cloud-based orchestrator, according to some embodiments. In step 202, with an orchestrator, process 200 enables an administrator to configure iNode(s). In step 204, with the orchestrator, process 200 can push container-based applications to designated iNode(s). In step 206, with the orchestrator, process 200 can manage container-based applications in the designated iNode(s). It is noted that in other example embodiments, a virtual machine (VM) or some other technology can be utilized in lieu of container-based applications.

A 'Things in the Things Area Network' (TAN) trust metric can be implemented. The TAN trust metric can be utilized with respect to, inter alia: volume of data in an iNode system; provide firmware update; call device API for usage statistics; virus signature across network or customer; and/or edge analytics enablement, etc. The TAN can be deployed in unsecure locations. A TAN trust metric can be based on such factors as, inter alia: whether the firmware of the 'thing' (e.g. a legacy sensor, etc.) was recently updated, whether the 'thing' has been offline for a period of time and then came back online; whether there was a change in the volume and/or frequency of the data from the 'thing', etc. These factors can indicate that a 'thing' has been compromised in terms of security. The TAN Trust Metric, along with edge analytics, can be enabled by iNode. The iNode can detect the 'things' that have been compromised so that they can be isolated.

Figure 3:
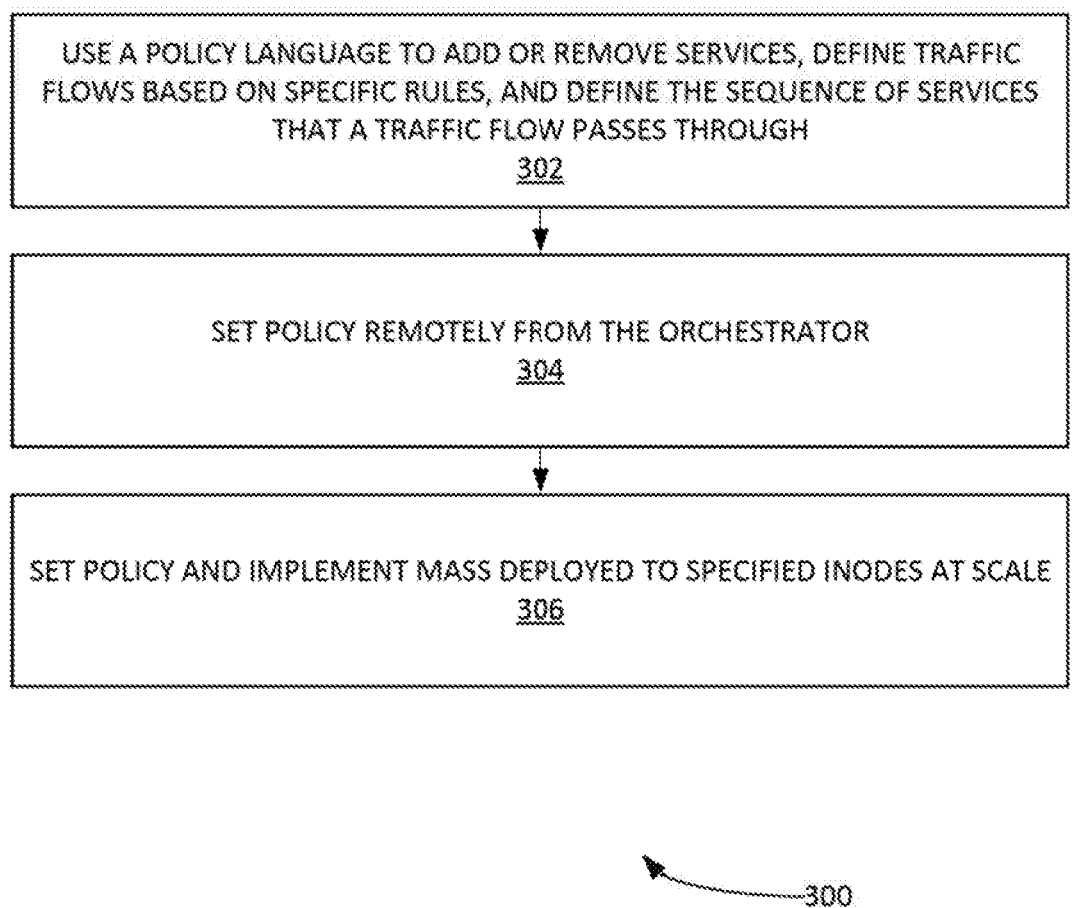
FIG. 3 illustrates an example process for dynamic policy management of an iNode system, according to some embodiments.

FIG. 3 illustrates an example process 300 for dynamic policy management of an iNode system, according to some embodiments. Process 300 can be used to implement, inter alia: service chain optimization; policy-based network implementation; east-west network implementation; etc. In step 302, process 300 can use a policy language to add or remove services, define traffic flows based on specific rules, define the sequence of services that a traffic flow should pass through, etc. In step 304, process 300 can remotely set policy from an orchestrator. This policy can be changed or updated at any time. In step 306, process 300 can set the policy once and mass deploy the policy to iNodes (e.g. at scale).

It is noted that iNodes can be deployed behind a firewall. iNodes can communicate with each other even if either or both are behind a firewall, without requiring any exception in the firewall rules.

iNodes can be deployed in a secure multi-tenant network. For example, multiple networks on the same iNode for multiple tenants that are completely isolated from each other such that any data leak between the tenants can be prevented.

iNodes can be deployed in a many-to-many network. Network traffic monitoring and filtering/forwarding rules can allow many to many data replication and forwarding. It also provides the ability to aggregate traffic using a hierarchy of iNodes. Additionally, time-stamped data flow and connection level audit reports for troubleshooting or compliance can be automatically generated.

Figure 4:
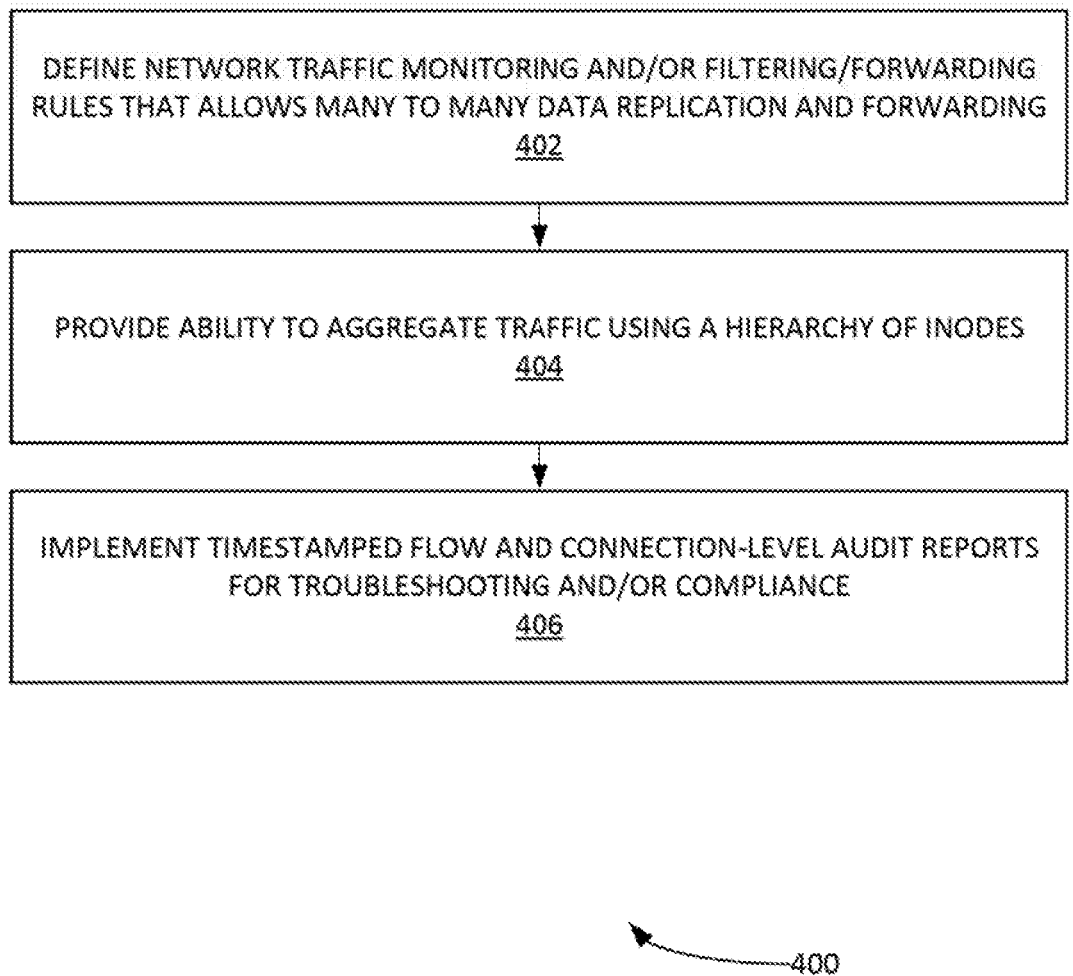
FIG. 4 illustrates an example process of an iNode system, according to some embodiments.

FIG. 4 illustrates an example process 400 of an iNode system, according to some embodiments. In step 402, process 400 can define network traffic monitoring and/or filtering/forwarding rules that allow many to many data replication and forwarding. In step 404, process 400 can provide the ability to aggregate traffic using a hierarchy of iNodes.

In step 406, process 400 can implement a time-stamped flow and/or connection-level audit reports for troubleshooting and/or compliance.

Figure 5:
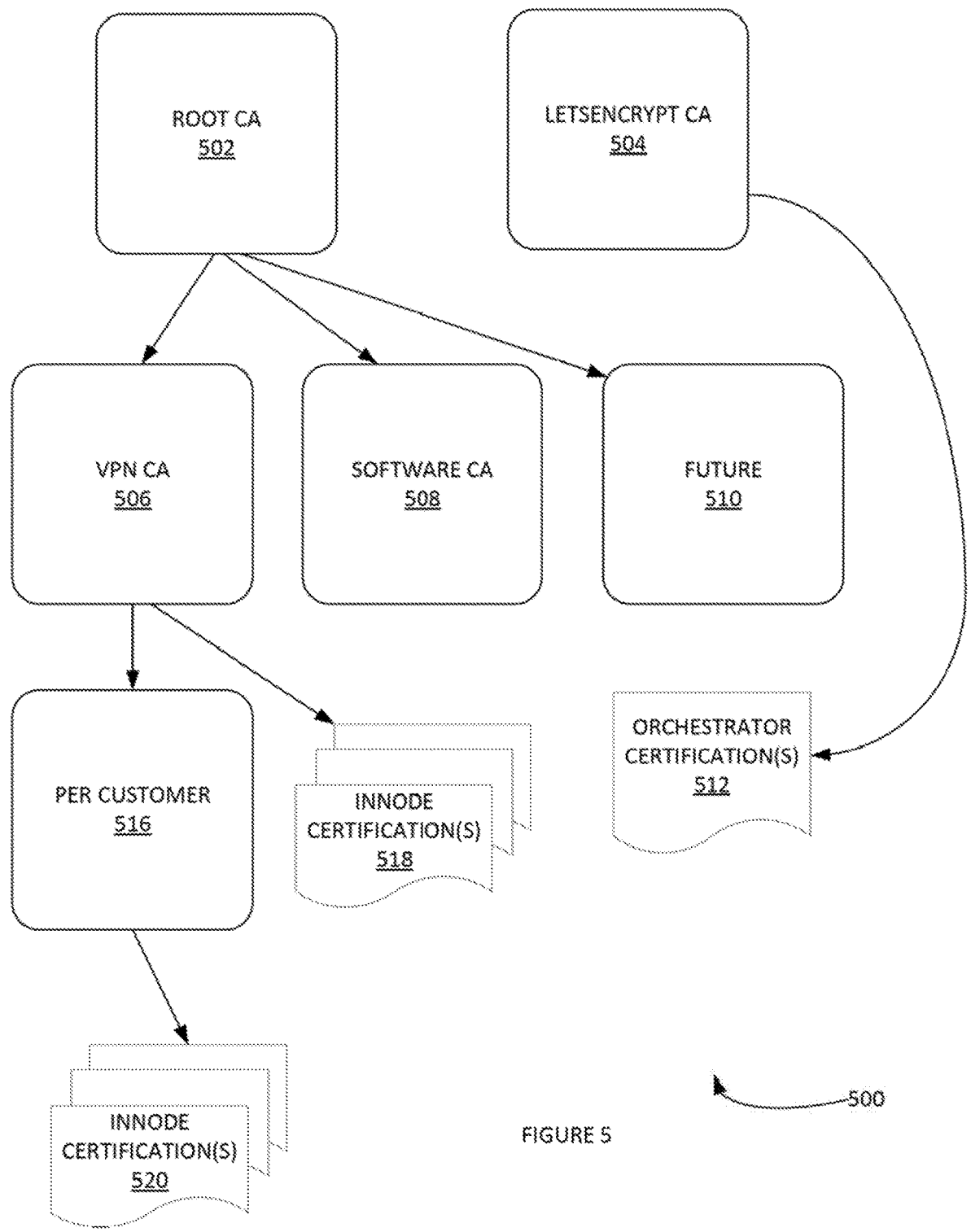
FIG. 5 illustrates an example iNode PKI implementation, according to some embodiments.

FIG. 5 illustrates an example iNode PKI implementation 500, according to some embodiments. Example iNode PKI implementation 500 can be used to provide a multi-domain trust-management system. The multi-domain trust-management system can utilize cryptographic techniques to achieve separation between domains. A domain can be a hierarchical collection of users, customers, functions, physical locations etc.

A root CA 502 can be provided. Root CA 502 can be set to not be online. Root CA 502 can provide a certificate that can be the base to issue multiple intermediate CA certificates with varying validation requirements (such as those provided below root CA 502). VPN CA 506 can provide a VPN certificate for a VPN to with an iNode and/or an Orchestrator (e.g. e.g. iNode certificate(s) 518, etc.). Software CA 508 can provide a CA for policy signing, image signing, etc. Future module 510 can be reserved for other CA's added at a later time. Customer module 516 can provide iNode certificate(s) 520 on a per customer basis.

Upon iNode startup (e.g. first boot of an iNode) the following steps can be taken. A local key pair (e.g. in file, TPM, etc.) can be generated. A Certificate Signing Request (CSR) can be sent to VPN CA 506 with a specific machine identifier (e.g. with an API, with a SCEP implementation, etc.). This can be implemented in a secure environment such as, inter alia: office to VPN to PKI VPC in AWS. A certificate can be received and locally stored.

In an orchestrator, on creating an iNode, a certificate can be available to be assigned to an instance (e.g. to securely provision a virtual instance of an iNode). A virtual iNode can be created in the orchestrator. The orchestrator can generate a local key pair on behalf of iNode. The CSR can be communicated to VPN CA 506.

In one example, an AWS volume (e.g. an Amazon Web Services volume and/or a volume of another a collection of remote computing services) can be created with a key and certificate with CA certificate chain as its contents. This can be downloaded from the orchestrator. When the instance is made available using the AMI, it can be mounted as a volume or provided as user data. A virtual iNode can save the key and certificate locally. It is noted that the virtual iNode's machine identifier is not in the certificate, and may be a registration identifier. It is noted that any secure volume (e.g. of which an AWS volume is an example) can be created to store the identity of iNode in various embodiments.

Figure 6:
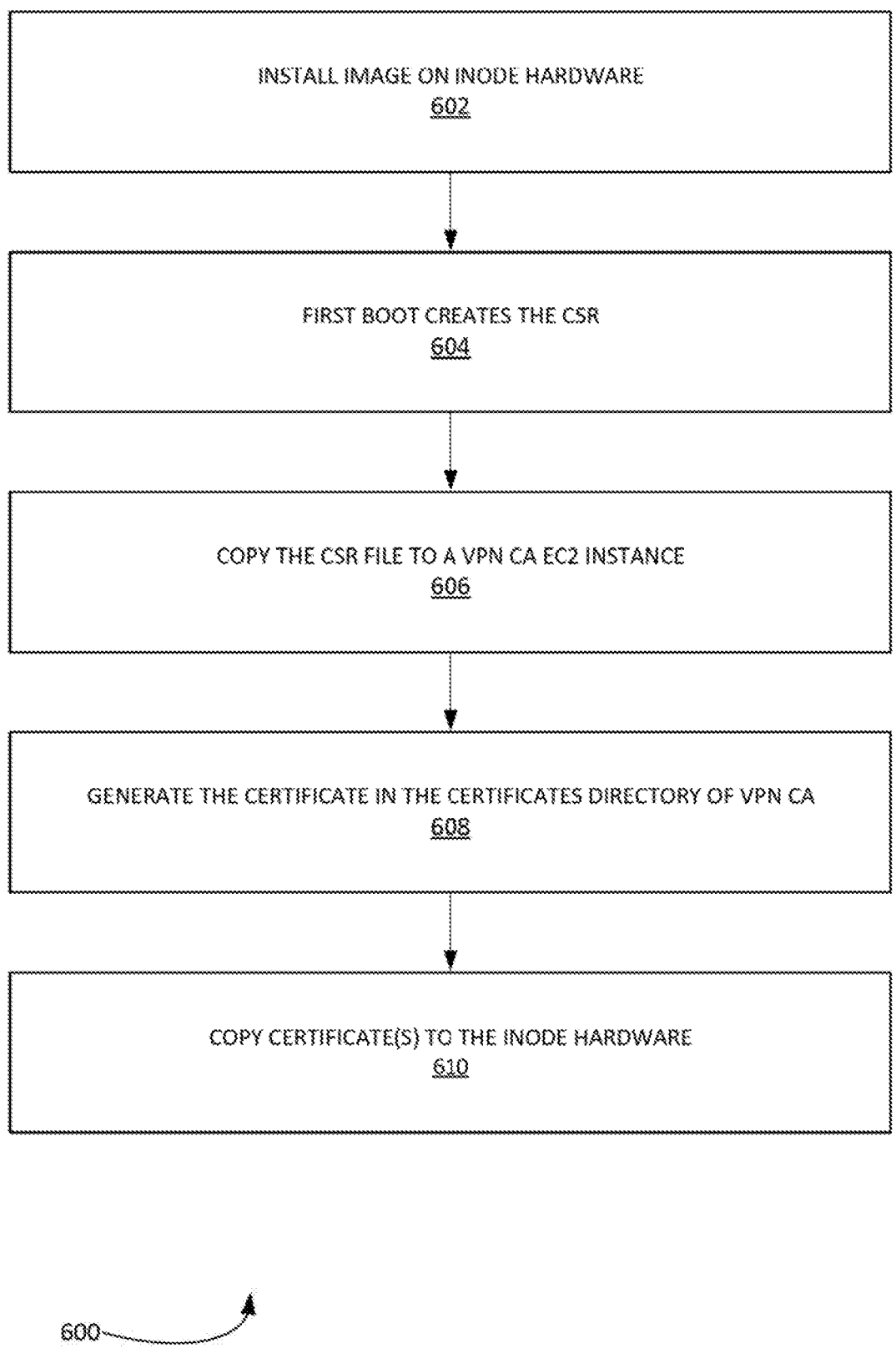
FIG. 6 illustrates an example process for manufacturing iNode hardware, according to some embodiments.

FIGS. 6-9 illustrate example processes for manufacturing iNode hardware, according to some embodiments. FIG. 6 illustrates an example process 600, according to some embodiments. Process 600 can install image(s) on iNode hardware in step 602. Process 600 can create the CSR in step 604. Process 600 can copy the CSR file to a VPN CA EC2 instance in step 606. Process 600 can generate the certificate in the certificate's directory of VPN CA in step 608. Process 600 can copy certificate(s) to the iNode hardware 610.

Figure 7:
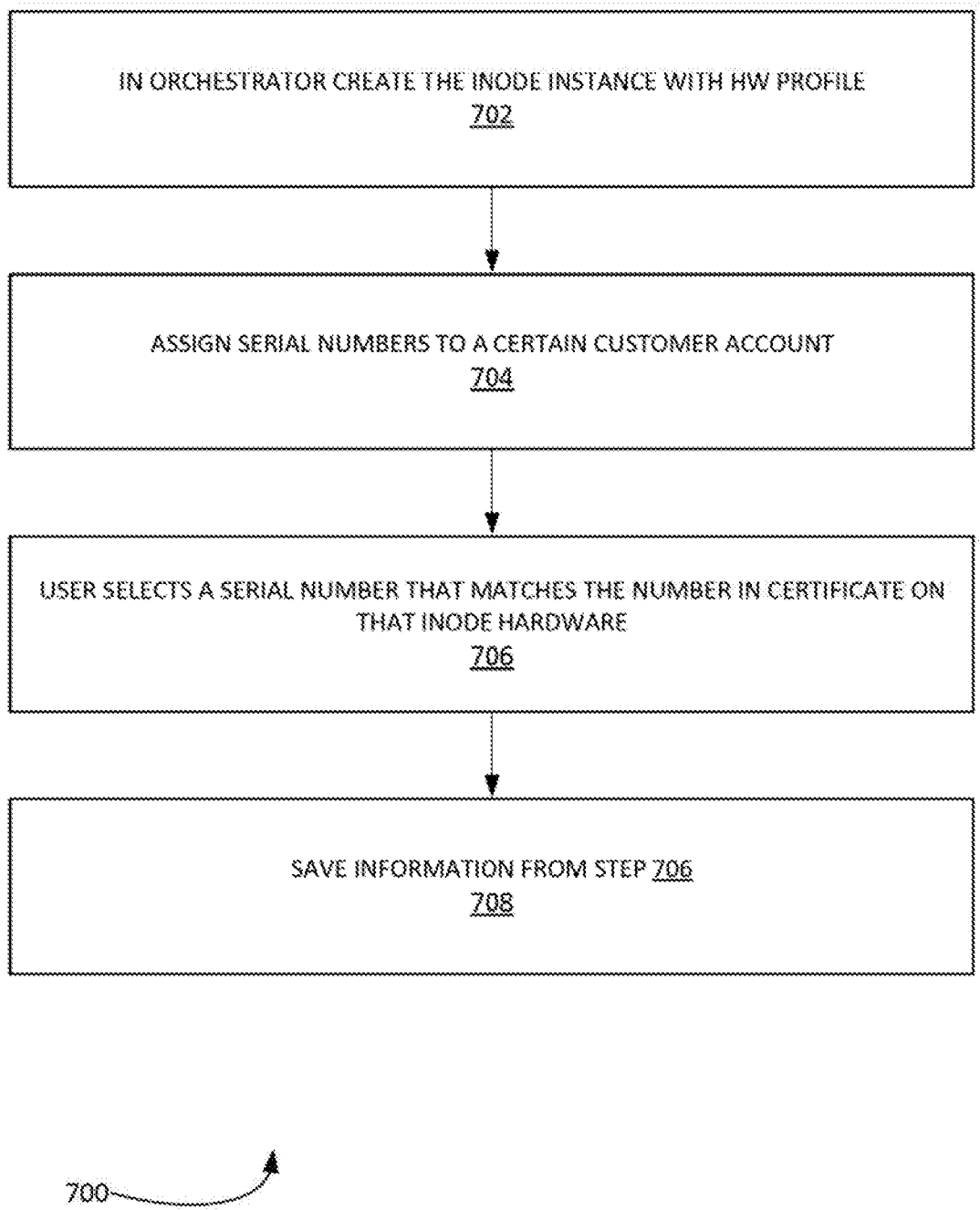
FIG. 7 illustrates an example process for manufacturing iNode hardware, according to some embodiments.

FIG. 7 illustrates an example process 700, according to some embodiments. Process 700 can create the iNode instance in the orchestrator with a HW (hardware) profile in step 702. Process 700 can assign serial numbers to a certain customer account 704. Process 700 can enable a user to select a serial number that matches the number in certificate on that iNode hardware 706. Process 700 can save information from step 706 in step 708.

Figure 8:
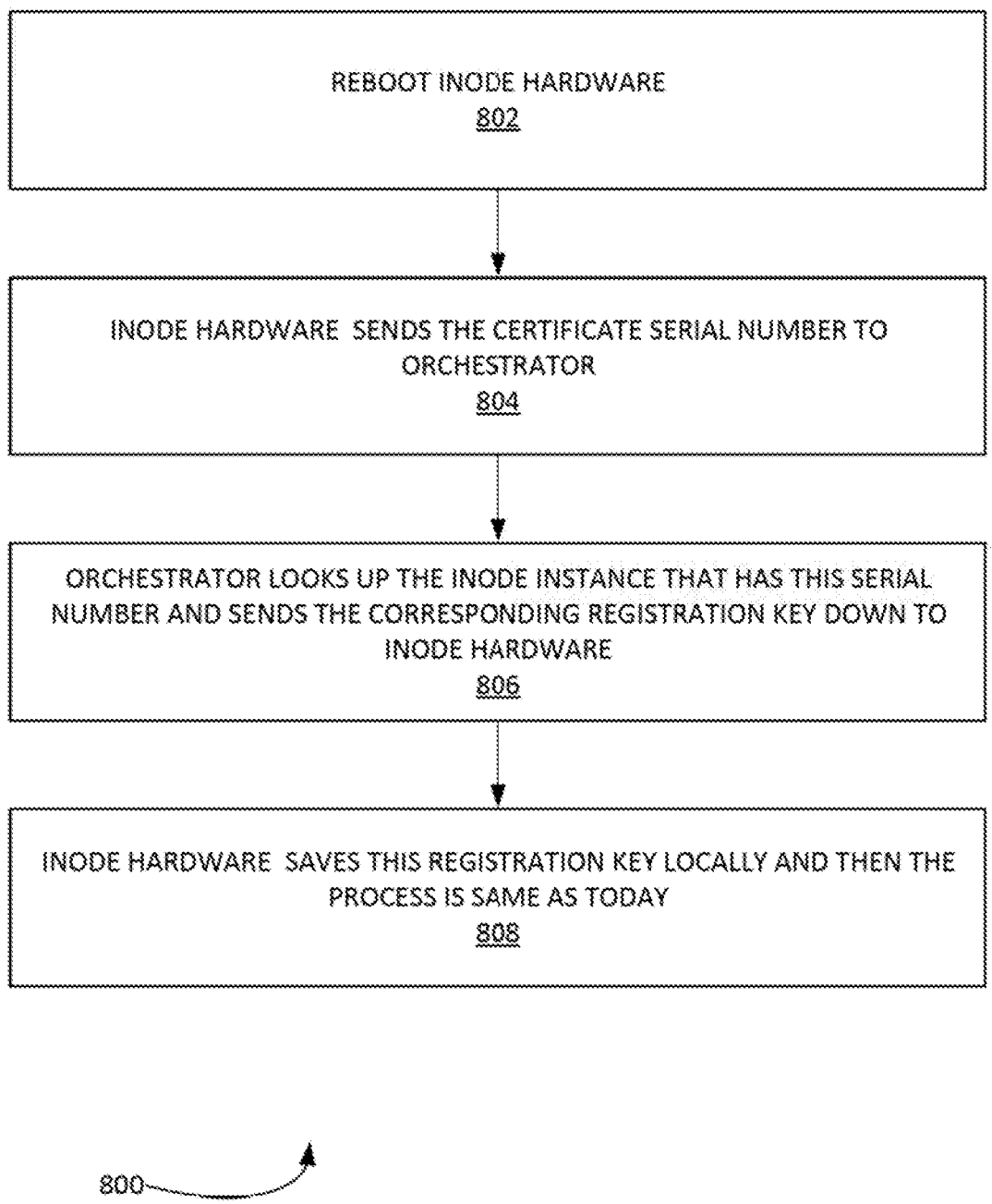
FIG. 8 illustrates an example process for manufacturing iNode hardware, according to some embodiments.

FIG. 8 illustrates an example process 800, according to some embodiments. In step 802, the iNode hardware can be rebooted. In step 804, iNode hardware sends the certificate serial number to orchestrator. In step 806, Orchestrator looks up the iNode instance that has this serial number and sends the corresponding registration key down to iNode hardware. In step 808, iNode hardware saves this registration key locally.

Figure 9:
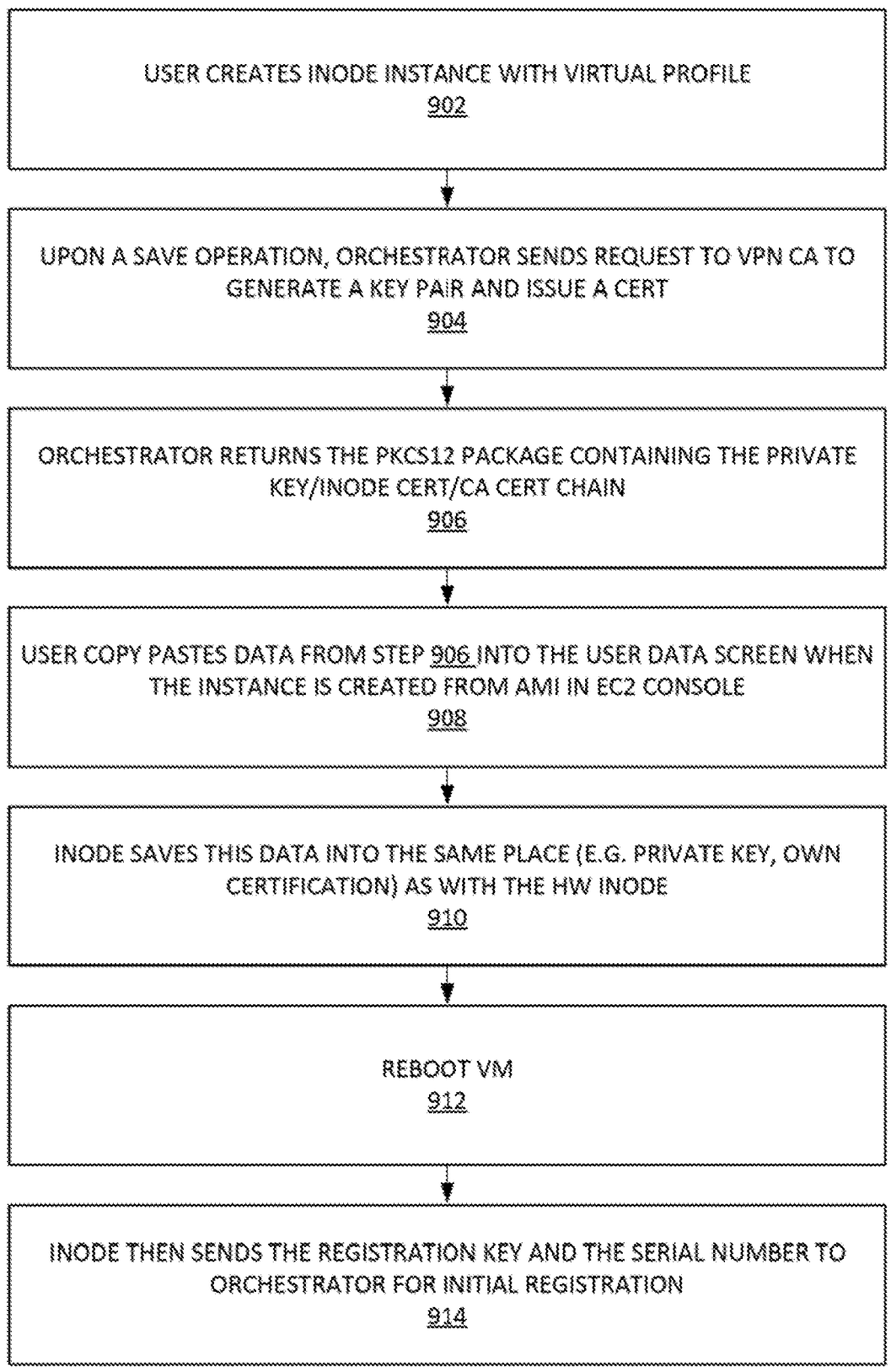
FIG. 9 illustrates an example process for manufacturing iNode hardware, according to some embodiments.

FIG. 9 illustrates an example process 900, according to some embodiments. In step 902, a user creates an iNode instance with a virtual profile. Upon a save operation, orchestrator sends a request to the VPN CA to generate a key pair and issue a certificate in step 904. In step 906, an orchestrator returns a package (e.g. a PKS12 package, etc.) containing the private key/iNode cert/CA cert chain. In step 908, a user copy/pastes data from step 906 into the user data screen when the instance is created from a VM (e.g. AMI, etc.) in a console (e.g. an EC2 console, etc.). In step 910, the iNode saves this data into the same place (e.g. private key, own certification, etc.) as with the HW iNode. In step 912, process 900 can reboot the VM. In step 914, the iNode then sends the registration key and the serial number to orchestrator for initial registration. It is noted that other elements can be utilized in other cloud-computing platforms and that the present elements are provided by way of example and not of limitation.

In some embodiments, an iNode can be deployed in an ODM box and communicate with an iNode. The iNode in the ODM box can use an operating system that is substantially the same as an iNode running in a cloud-cloud computing platform except it can have zero-touch provisioning/deployment. In some embodiments, a Legacy Sensor can be defined as either an IP or a non-IP based sensor which generates measurement data for another device. The configuration can be automatically implemented (e.g. the iNode can automatically connect to pre-designated orchestrator, obtain its policies, be authenticated, etc.). An iNode can have a secure parameter. It is noted that, in some examples, multiple cloud-computing platforms can be implemented for the sensor(s) of different vendors. In this way, each iNode can obtain its own respective data. This can be implemented in a one-to-many connection from edge iNode that is sending data to multiple destinations.

In one example, one or more iNodes can be installed in an oil platform (e.g. an apparatus for offshore oil drilling). For example, iNodes can be communicatively coupled with various sensors such as, inter alia: gas emission detectors, mudflow sensors, depth tracking sensors, etc. Sensor data can be obtained and aggregated. Various edge analytics can be implemented by logic programmed into the one or more iNodes. Data can be parsed and formatted for delivery via an available communication network (e.g. a satellite-telephonic network, etc.). Accordingly, iNode can aggregate data and it can compress/optimize the data for satellite transmission. Various oil platforms can each have their own analytics running in the respective iNodes.

In another example, one or more iNodes can be installed in a building. For example, each floor can have an iNode. Floor-level iNodes can perform floor level edge analytics as well as aggregate floor-related data for communication to an iNode in a cloud-computing platform. Moreover, each building can have an iNode for building-level analytics. Building-level iNodes can perform building level edge analytics as well as aggregate building-related data for communication to an iNode in the cloud-computing platform. An example of a legacy sensor in this case would be a BACNet over MSTP sensor that is connected using the serial port (e.g. RS232/RS485) to an iNode.

In another example, a campus architecture can have a hierarchical system of iNodes deployed (e.g. each floor with an iNode, each building with an iNode, each campus with an iNode, etc.). Campus-level iNodes can perform campus level edge analytics as well as aggregate campus-related data for communication to an iNode in the cloud-computing platform.

In some embodiments, custom modules can be designed by various users and/or third parties for installation in on-site/local iNodes. These modules can have specific functionalities related to the specified needs of the user. For example, a module can be generated to read and/or perform specified analytics on certain types of legacy sensors. Modules can be configured for formatting data in specified formats for communication across certain computer networks. Module installation and management can be performed via an orchestrator in a cloud-computing platform. The orchestrator can be accessed by an enterprise administrator via a dashboard.

Example Computing Systems

Figure 10:
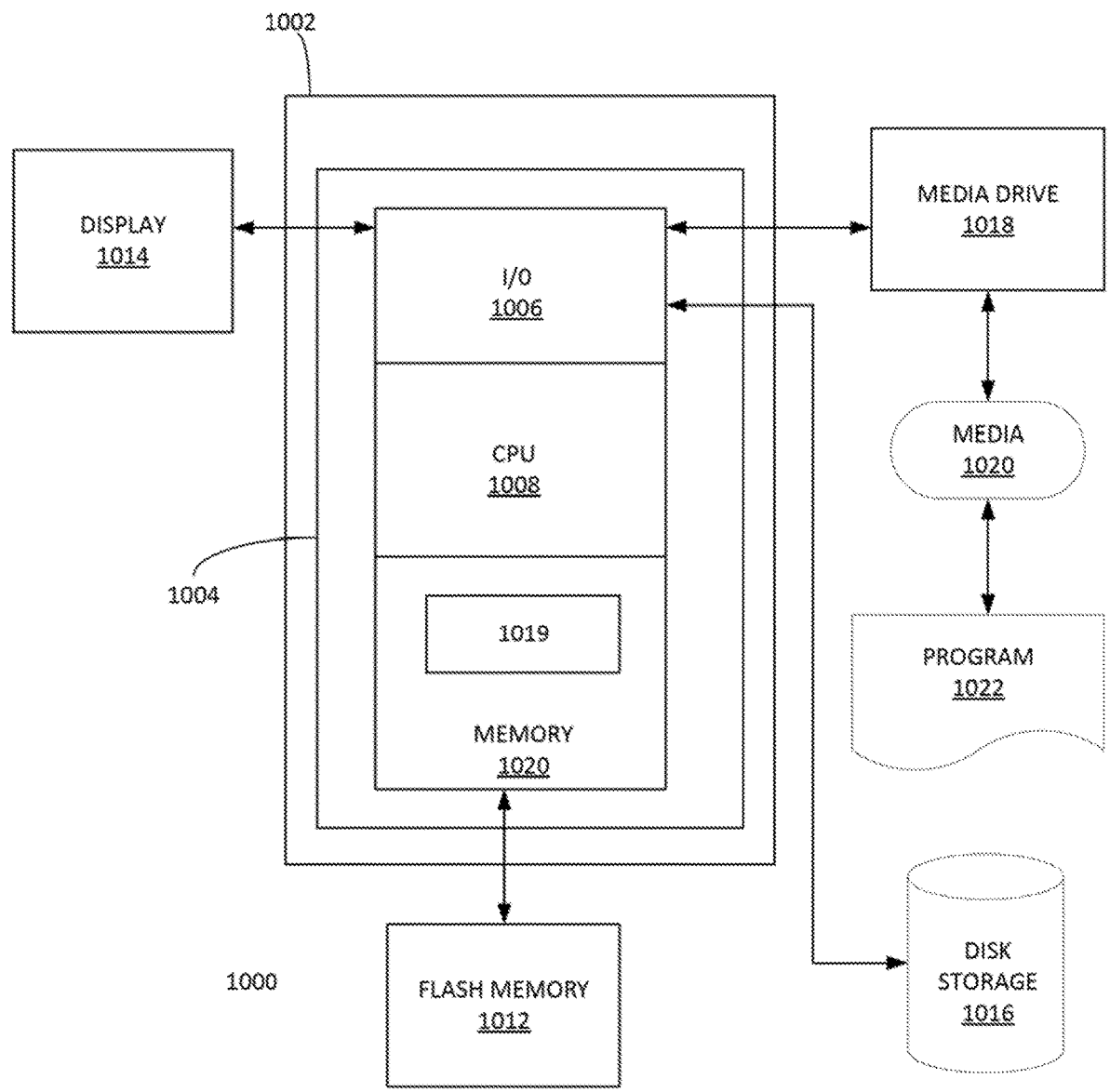
FIG. 10 is a block diagram of a sample-computing environment that can be utilized to implement various embodiments.

FIG. 10 depicts an exemplary computing system 1000 that can be configured to perform any one of the processes provided herein. In this context, computing system 1000 may include, for example, a processor, memory, storage, and I/O devices (e.g., monitor, keyboard, disk drive, Internet connection, etc.). However, computing system 1000 may include circuitry or other specialized hardware for carrying out some or all aspects of the processes. In some operational settings, computing system 1000 may be configured as a system that includes one or more units, each of which is configured to carry out some aspects of the processes either in software, hardware, or some combination thereof.

FIG. 10 depicts computing system 1000 with a number of components that may be used to perform any of the processes described herein. The main system 1002 includes a motherboard 1004 having an I/O section 1006, one or more central processing units (CPU) 1008, and a memory section 1010, which may have a flash memory card 1012 related to it. The I/O section 1006 can be connected to a display 1014, a keyboard and/or other user input (not shown), a disk storage unit 1016, and a media drive unit 1018. The media drive unit 1018 can read/write a computer-readable medium 1020, which can contain programs 1022 and/or data. Computing system 1000 can include a web browser. Moreover, it is noted that computing system 1000 can be configured to include additional systems in order to fulfill various functionalities. Computing system 1000 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc. It is noted that in other example embodiments, system 1000 can be a multi-interface system that can include other interfaces, such as, serial ports, Controller Area Network (CAN bus), Modbus, wireless interfaces etc.

Additional Process

Figure 11:
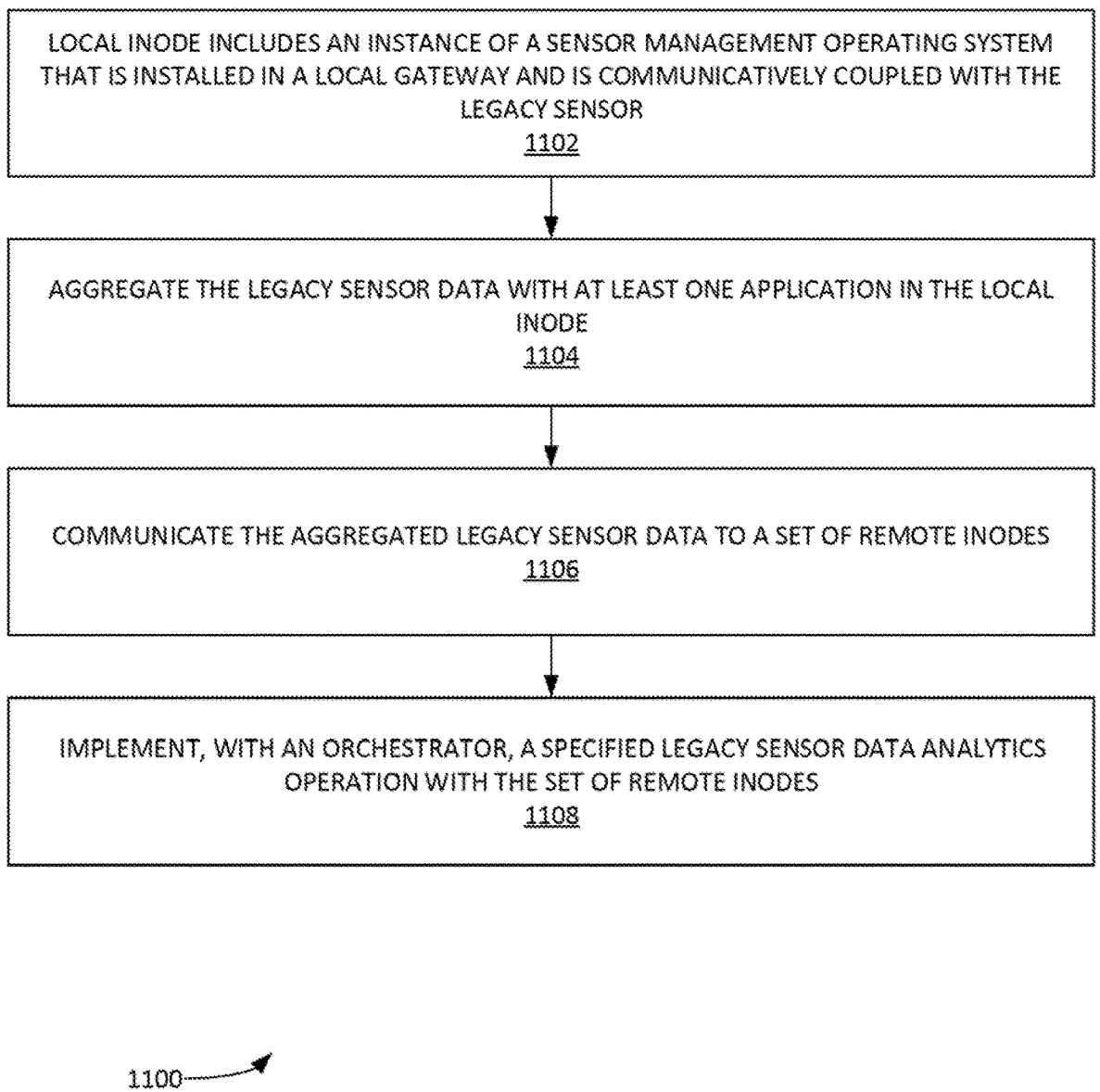
FIG. 11 illustrates an example process for managing an iNode system includes the step of obtaining, with a local iNode, a legacy sensor data of a legacy sensor, according to some embodiments.

FIG. 11 illustrates an example process 1100 for managing an iNode system includes the step of obtaining, with a local iNode, a legacy sensor data of a legacy sensor, according to some embodiments. In step 1102, the local iNode includes an instance of a sensor management operating system that is installed in a local gateway and is communicatively coupled with the legacy sensor. In step 1104, process 1100 aggregates the legacy sensor data with at least one application in the local iNode. In step 1106, process 1100 communicates the aggregated legacy sensor data to a set of remote iNodes. In step 1108, process 1100 implements, with an Orchestrator, a specified legacy sensor data analytics operation with the set of remote iNodes.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method for managing an iNode system comprising:
    obtaining, with a local iNode, a legacy sensor data of a legacy sensor, wherein the local iNode comprises an instance of a sensor management operating system that is installed in a local gateway and communicatively coupled with the legacy sensor, wherein the local iNode sensor is connected with the legacy sensor via a local area network, wherein the local iNodes sensor implements an edge analytics operation on the legacy sensor data, wherein the edge analytics operation comprises an automated analytical computation performed on legacy sensor data at the local iNode instead of waiting for the legacy sensor data to be sent back to a centralized data store, wherein the local iNode comprises an onsite iNode;
    aggregating the legacy sensor data with at least one application in the local iNode;
    communicating the aggregated legacy sensor data to a set of remote iNodes;
    implementing, with an Orchestrator, a specified legacy sensor data analytics operation with the set of remote iNodes, wherein the Orchestrator implements a policy and is a management platform for the local iNode and the set of remote iNodes, wherein the Orchestrator is a cloud-based Orchestrator, wherein the cloud-based Orchestrator securely enables an administrator to configure all iNode instances, and wherein the cloud-based Orchestrator securely pushes a set of applications to a specified iNode instances.

2. The computerized method of claim 1, wherein the local area network comprises an Ethernet Local Area Network.

3. The computerized method of claim 1, wherein the set of remote iNodes comprises one or more iNodes implemented in a cloud-computing platform.

4. The computerized method of claim 1, wherein the set of remote iNodes comprises one or more physical iNodes.

5. The computerized method of claim 1, wherein the Orchestrator securely implements policy and comprises a management platform for all iNode instances.

6. The computerized method of claim 5, wherein the Orchestrator comprises a cloud-based Orchestrator.

7. The computerized method of claim 6, wherein the set of applications comprises a container-based application.

8. The computerized method of claim 6, wherein the set of applications comprises a virtual machine.

9. The computerized method of claim 6, wherein the legacy sensor comprises an Internet protocol (IP)-based sensor which generates measurement data for another device.

10. An iNode-network system comprising:
    a processor;
    a memory containing instructions when executed on the processor, causes the processor to perform operations that:
        obtain, with a local iNode, a legacy sensor data of a legacy sensor, wherein the local iNode comprises an instance of a sensor management operating system that is installed in a local gateway and communicatively coupled with the legacy sensor, wherein the local iNode sensor is connected with the legacy sensor via a local area network, wherein the local iNodes sensor implements an edge analytics operation on the legacy sensor data, wherein the edge analytics operation comprises an automated analytical computation performed on legacy sensor data at the local iNode instead of waiting for the legacy sensor data to be sent back to a centralized data store, wherein the local iNode comprises an onsite iNode;
        aggregate the legacy sensor data with at least one application in the local iNode;
        communicate the aggregated legacy sensor data to a set of remote iNodes;
        implement, with an Orchestrator, a specified legacy sensor data analytics operation with the set of remote iNodes, wherein the Orchestrator implements a policy and is a management platform for the local iNode and the set of remote iNodes, wherein the Orchestrator is a cloud-based Orchestrator, wherein the cloud-based Orchestrator securely enables an administrator to configure all iNode instances, and wherein the cloud-based Orchestrator securely pushes a set of applications to a specified iNode instances.

11. The iNode-network system of claim 10,
    wherein the local area network comprises an Ethernet Local Area Network.

12. The iNode-network system of claim 11,
    wherein the set of remote iNodes comprises one or more iNodes implemented in a cloud-computing platform, and
    wherein the set of remote iNodes comprises one or more physical iNodes.

13. The iNode-network system of claim 11,
    wherein the Orchestrator securely implements policy and comprises a management platform for all iNode instances.

14. The computerized method of claim 13, wherein the set of applications comprises a container-based application.

15. The computerized method of claim 13, wherein the set of applications comprises a virtual machine.

16. The computerized method of claim 13, wherein the legacy sensor comprises a BACNet over MS/TP (Master-Slave Token Passing) sensor.

17. The computerized method of claim 16, wherein the legacy sensor is connected using a serial port to the local iNode.

\* \* \* \* \*